(No Model.)
C. G. FOLAND.
CULINARY FRYING FRAME.
No. 520,846.
Patented June 5, 1894.
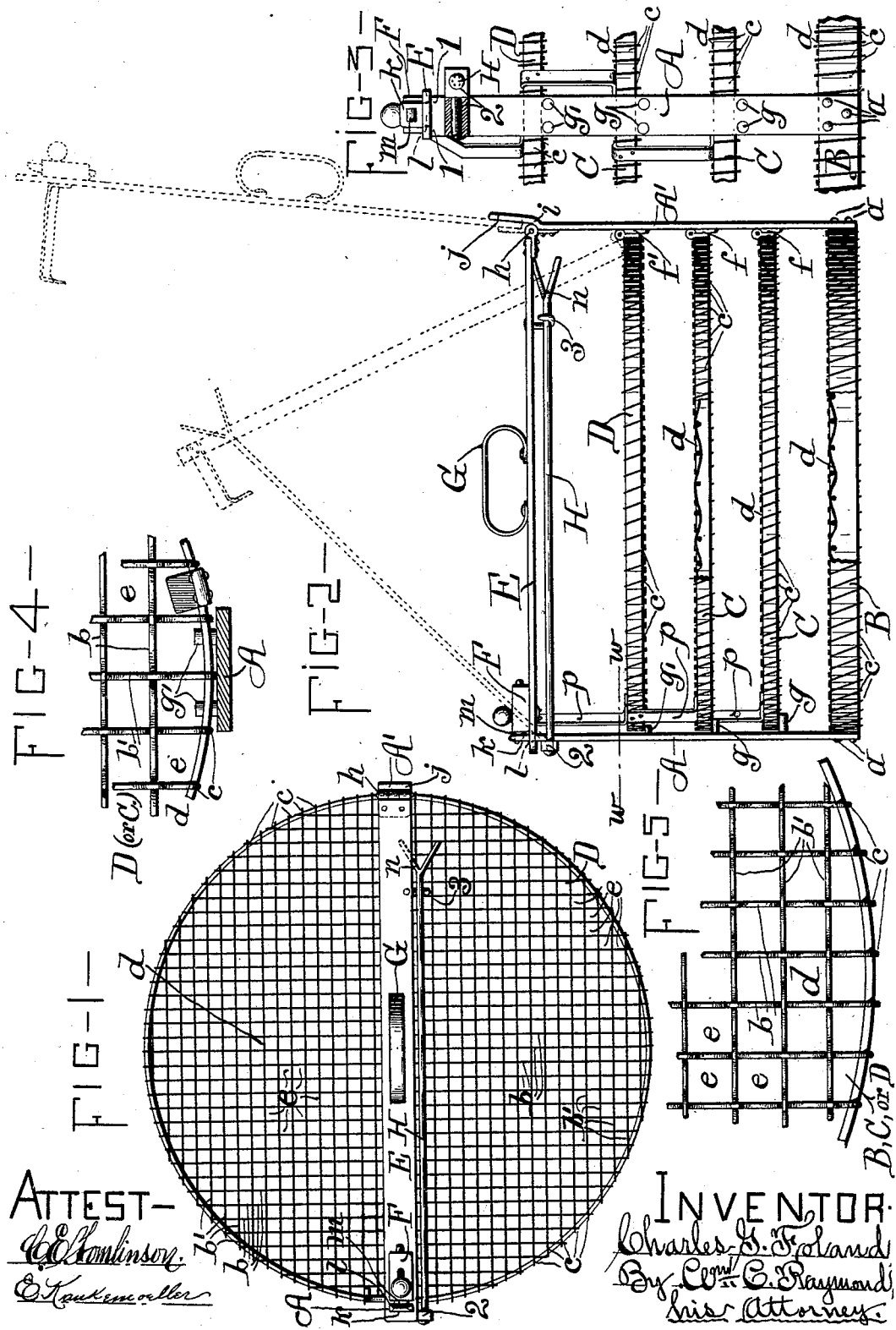

UNITED STATES PATENT OFFICE.

CHARLES G. FOLAND, OF ONEIDA, NEW YORK.

CULINARY FRYING-FRAME.

SPECIFICATION forming part of Letters Patent No. 520,846, dated June 5, 1894.

Application filed February 14, 1894. Serial No. 500,173. (No model.)

*To all whom it may concern:*

Be it known that I, CHARLES G. FOLAND, a citizen of the United States, residing at Oneida, in the county of Madison and State of New York, have invented certain new and useful Improvements in Culinary Frying-Frames; and I do hereby declare the following to be a full, clear, and exact description of the invention, such as will enable others skilled in the art to which it appertains to make and use the same, reference being had to the accompanying drawings, in which—

Figure 1 is a top-plan of my improved culinary frying-frame as appearing in its closed operative position for the frying of articles for food retained and upheld thereby; Fig. 2 a side elevation of my device in its aforestated closed or shut position and looking edgewise toward its parallel side standards, horizontal locking-bar, &c.; Fig. 3 an enlarged detail, in elevation, of its front or forward shelf-supporting standard and contiguous parts, in locked position; Fig. 4 a cross-sectional detail, considerably enlarged, and looking downward upon the shelf portions, taken at dotted line $w$, $w$, Fig. 2, of the drawings; and Fig. 5 is an enlarged fragmentary detail of one of the duplicate constructed open-work shelves appertaining to my construction of frying-frame.

Similar letters and figures of reference indicate corresponding parts throughout the several views embodied in the drawings.

My invention relates to that species or description of culinary appliances designed or adapted for utilization in frying doughnuts, potatoes, oysters, &c., for home or general consumption, and commonly denominated as frying utensils.

The purpose and object of my invention are the production of a culinary frying-frame (or device) of the class referred to, of simple, and durable construction; formed wholly of suitable metal, as for instance steel, iron or copper; ready and effective in operation; capable of retaining prior to and during the process of frying a quantity of cakes, &c., the number thereof virtually being limited only by the dimensions and capacity therefore of the device; the formation of an open-work frame or stand provided with a number of pivotally movable perforated shelves and other members whereby when opened up cakes, &c., for frying may readily while in their doughy or raw state be expeditiously and accurately arranged on the shelves and then the shelves and other members quickly secured and locked against displacement for the retention in place of the shelves and their contents during the act of frying; a device wherein the frying of the food products in a doughy or raw state is accomplished through the precipitation of the appliance into a vessel of boiling lard or other grease and retention therein of same until the contents of the shelves are fried; a frying-frame insuring by reason of its novel formation simultaneous frying of the food products held thereby upon both sides—top and bottom, and uniformity in their degree of frying; and, finally, the embodiment of varied novel features in the detail construction of a device of this character imparting increased effectiveness, capacity, and reliability of operation thereof, as will be enumerated hereinafter.

My invention consists in the novel features of construction, combination, co-adaptation of parts, and operation hereinafter described, and specifically set forth in the claims hereunto annexed.

Referring to the accompanying drawings, A, A', denote respectively, in the order named, the front and rear standards appertaining to my culinary frying-frame, which standards, of suitable height, are formed of flat bars of iron, steel, or other satisfactory metal, and, preferably, both standards being thoroughly rigid.

B is a circular band of metal, disposed on edge, whereto, at diametrically opposite sides of its outer periphery the lower ends of the standards A, A', are respectively firmly secured by means of rivets $a$; the lower ends of aforesaid vertical standards of the frying-frame terminating practically flush with the lower edge of the band B. Said stated band has extended across the circular space or field located within the confines of the hoop, a series of parallel wires $b$ spanning the opening in one direction and a series of parallel cross-wires $b'$ standing across in an opposite direction, and on a like horizontal plane, the respective wire ends being carried around or otherwise satisfactorily fastened to the band, to insure their retention in position, as indicated, in part, by the letters c. Preferably the wires forming the interwoven seat d are crimped or corrugated, as clearly brought out in Figs. 2, 4, and 5; the effect thereof being to prevent lateral displacement of same, as is readily evident; furthermore the wire openwork seat extends across the interior of the band or hoop B on a plane practically lineal with the top annular edge thereof; and, moreover the interstices or openings e, of the seat d are, by choice, exceedingly large as compared with the diameter of the interlaced wires creating same. Said rigidly secured band B provided with the open-work seat portion aforementioned, serves as a stationary circular shelf for doughnuts, &c., requiring frying, as well as being a component and salient member of the framework of my device.

Above the immovable shelf B aforementioned there are pivotally mounted one or more shelves C, disposed in their normal attitude horizontally, the first movable shelf C extending across from standard to standard at a slight or satisfactory distance from the under stationary shelf B, while the second overhead movable shelf C (if utilized) extends across from standard to standard at a height above the first pivoted shelf corresponding to the distance of that from the rigid shelf B. The detail construction of the shelf (or shelves) C is identical with that embodied by the lower stationary shelf, and their diameter substantially similar, consequently the reference letters referring to detail parts of the rigid shelf correspondingly apply to the movable shelf or shelves stated. Usually, as delineated, I employ a wider and heavier metallic band for the stationary shelf B for the securing of greater weight to the structure, the necessity of a certain amount of weight existing, being made evident hereinafter. The shelf or shelves C (normally disposed on horizontal planes), are pivotally secured, at their rear portion, to the inner face of the back standard A' by means of hinges (or other satisfactory pivotal connections) f erected at suitable points on the standard, the movable leaf of the hinge being secured firmly to the band portion of the shelf or shelves; and projecting from the inner face of the diametrically opposite front standard A, at proper points thereof, are studs g, preferably in pairs, the upper pair extending laterally a lesser distance than the lower pair, and upon which pairs of studs (or lugs) the forward portions of the hinged shelves C rest and are upheld in horizontal position thereby.

D indicates a perforated disk-shaped member identical in structure to that embodied by the pivotally movable shelf or shelves C, and which is located above the under shelf C at a height corresponding to the distance existing between any two of the underlying shelves; said member D likewise being at its rear pivotally secured to the rear standard A' by a hinged connection f', and at its front detachably upheld on a horizontal plane by means of studs g', (preferably a pair,) standing laterally from the inner face of the forward standard A, said stud (or pair of studs) being of less length than the underlying studs supporting the contiguous shelf C. The detail formation of the pivotal or hinged disk-like member D being analogous with that embraced in the underneath shelves, obviously the same reference letters used therein as to specific portions apply equally to this stated member. While in appearance this hinged member D is similar to that of the shelves *per se*, and apparently might be so utilized, it is, nevertheless, not calculated nor designed for utilization as a shelf or seat for the deposit of food products thereon, but contrariwise its intent and the function thereof in this device is to act and serve as a guard or overhead barrier against the arising upward and floating of the frying doughnuts or other food products disposed on the openwork bed of the underlying shelf C; the confining contact of said overhead guard D thoroughly insuring by the barrier it presents the occupancy of the underneath shelf by the frying doughnuts or other food products held immersed within the body of hot lard or other grease, and which, were no overhead barrier presented, would from their swelling under frying and the buoyancy resultant, very naturally arise and float about at the top of the boiling grease into which the major portion of my appliance is immersed. Obviously the under side of the openwork shelf C beneath the guard member D acts as a guard or barrier to the uprising and floating of the frying products disposed on the underlying duplicate shelf C, while said shelf last mentioned coincidently acts as a guard or barrier to the arising from their support of the frying products located on the bottom shelf B.

This providing of means for the complete immersion of the doughnuts or other food products upon the various shelves within the boiling grease while undergoing frying, is an all important feature of my device, and is absolutely essential to the proper operation thereof, i. e., concurrent and uniform frying of a quantity of doughnuts or other food products by the immersion and retention thereof in the heated fat (contained in a suitable vessel) for a brief period.

E is the hinged locking-bar, normally disposed horizontally, that spanning the space existent above the guard member D, forms a locking or rigid connection between the standards A, A', at their upper ends; said locking-bar, when closed, forming a component member of the frame *per se* wherein are pivotally mounted the shelves C and guard D; the locked attitude of the locking-bar assuring rigidity of the remainder of the frame, viz. the stationary standards and the lower connecting shelf. The locking-bar E is movably secured to the rear standard by a hinge or pivotal connection h contiguous the upper termination of said standard and where an offset *i* exists which upwardly terminates in a shoulder portion *j* rising upward a brief height above the location of the hinge aforestated. The front standard A upwardly terminates in a perforated tongue *k* which, when the locking-bar is carried downward to its horizontal position, will enter and penetrate through a slot *l* located in the contiguous forward extremity of the locking-bar E, the shouldered parts 1, 1, existing at the base of the tongue *k* preventing the forward end of the locking-bar from dropping unduly downward.

F is a spring-lock or catch erected upon the forward end of the locking-bar near the slot *l*, and having a finger post connecting with a spring-propelled locking-bolt *m* adapted to enter engagingly the orifice in the tongue *k* of the forward standard, thereby insuring practically rigid connection of the frame *per se*, and through means later to be referred to the assuring of the retention in place of the hinged shelves and guard member when disposed in operative horizontal positions.

G denotes the carrying and lifting handle appertaining to my appliance, and which is rigidly attached to the upper face of the locking-bar E midway its length.

H is a brace (or supporting) rod for the upholding of the guard and hinged shelves when carried upwardly for the filling of the successive shelves with food products to be fried. This brace-rod, normally located underneath the locking-bar and longitudinally therewith, and of nearly like length, is both swiveled and pivoted to the front standard, at its extremity, by a simple connection 2, while its free extremity is forked as denoted at *n*. When not in service the said brace rod is insured retention underneath the locking-bar and parallel therewith by means of a hook 3 standing down from said bar, and engaging the forked extremity of the rod.

*p* are guard-fingers, of angular shape, the upper one riveted to the under side of the locking-bar E contiguous its forward end, and bearing, when my device is in its closed position, by its free bent extremity downwardly upon the band portion of the underlying guard member D; the succeeding finger being riveted to the forward band portion of said member D and bearing (the shelves being in horizontal operative position) by its pendent angular extremity upon the contiguous rim portion of the underlying hinged shelf, while the said mentioned shelf is correspondingly provided with a similar guard (or pressure) finger bearing downwardly upon the underneath last one of the movable shelves. These mentioned guard fingers are evidently very essential for the most perfect operation of my device, their function being, as should be readily discernible, to prevent the guard D and under hinged shelves from rising or swinging upwardly through the upward pressure whereto they must necessarily be subjected when my appliance is immersed in boiling grease, by reason of the lifting characteristics possessed by the swelling, buoyant doughnuts, &c., undergoing frying, whose tendency to rise and float at the top of the body of hot grease, is well understood. Evidently, by my provision of the guard fingers any possibility of the shelves moving upwardly while my frying-frame is resting in a utensil filled with hot grease is thoroughly obviated, and coincidently any dislodgment of the doughnuts, &c., from the shelves, while frying, utterly impossible; the food products retaining the positions in which placed.

My purpose in utilizing an extra heavy and wider band for the formation of the lowermost and rigid shelf B constituting a component part of the frame-work proper of my device is to impart such requisite weightiness to the entire structure as will enable same to successfully resist the uplifting power inherent in the frying cakes, &c.; thereby insuring absolutely the necessary immersion of the device within the body of boiling grease for such space of time as is desired. Furthermore, my object in having the aforestated band wider, *i. e.*, higher, than the other shelf-bands is to provide more material and surface for the utilization of a larger number of rivets for the thorough and rigid securing of the standards A, A', by their lower ends to diametrically situated sides of outer periphery of the said band; which plurality of fastenings, whether rivets or bolts, necessarily insures greater stability and immovability of the standards.

When deemed desirable or preferable I may, in the formation of my frying-frame, dispense with all the studs standing inward from the forward standard except the lowermost one or pair, and whereby, in such curtailment, as is clearly apparent, the guard-fingers serve the double function of supporting the overhead shelves contiguous the front standard and on a horizontal plane, and preventing the shelves from arising to the raising power inherent in the cakes, &c., being fried; also, that when so preferred, I may, instead of having the brace-rod pivotally attached at one end to the front standard of the frame, so form the brace-rod that, by duplication, either end thereof is bifurcated or forked, and adapted to be laid away to one side when not required as a stay or brace; and when wanted for utilization as a temporary brace or support for the pivotally raised guard disk and shelves may, by the disposition of one forked end against the rim of the band or wire bed at the forward portion of the stationary shelf B, and the opposite forked end abutting against and upholding the uplifted shelf or shelves—the brace-rod being disposed incliningly upward and rearward—thoroughly attain the result desired and necessary. Moreover, as is very obvious, the offset and upwardly standing shoulder of the rear standard may be dispensed with if so wished, and instead the upper portion of said standard terminate slightly below the knuckle of the upper hinge, whereby it will form at its top edge a shoulder or support for the hinged locking-bar when same is raised slightly past a perpendicular.

In operating my improved culinary frying-frame—the first procedure being to fill the shelves thereof with the food products that are to be fried—I release (by pressing back the bolt of the lock F) the forward connection of the locking-bar E with the front standard, and swing said bar upward and rearward slightly past a perpendicular (as indicated by dotted work, Fig. 2), and permitting it by its hinged extremity to abut upon the shoulder $j$ of the rear standard, which sufficiently upholds the bar in its raised position; but, obviously, before swinging upward the locking-bar first releasing the forked extremity of the brace-rod H from the hook 3 of aforesaid bar and swinging the rod to one side sufficiently to be free of the framework and shelving. I next swing upwardly a distance (momentarily upholding same in upraised inclined attitude by means of my hand) the guard member D and shelf or shelves C, practically grouping them in their upraised state and, grasping the pivoted brace-rod swing it around toward the center of the frame and concurrently elevating same incliningly dispose its upstanding forked end engagingly against the bottom of the lowest shelf of the elevated grouped shelves. The aforementioned being now upheld out of the way, I proceed to place upon the stationary shelf B sufficiently to cover the same food products that are to be fried; and then, momentarily disengaging the forked extremity of the brace-rod H from the upheld shelves (meantime using my hand as a support) permit the lowest standing pivoted shelf C to drop down into horizontal position and resting by its forward portion upon the studs $g$ extending from the forward standard, over the stationary shelf. Filling the bed of said first shelf C with the raw food products awaiting frying, I through like procedure to that hereinbefore stated permit the second shelf C (if any) to drop down into its horizontal position, the forward portion thereof resting on the studs $g$ provided therefor, or in case the studs should be dispensed with the said shelf being upheld horizontally between the standards by means of the pendent guard finger $p$ which acts as a supporting medium therefor as well as serving the purpose of a guard against the undesired uprising of the under located companion shelf C. Disposing raw food products upon the perforated seat of the second and uppermost shelf, I disengage the brace-rod H from the shelf-like wire-meshed guard-disk D and allow the same to drop into horizontal position between the supporting standards, and next take hold of the upraised locking-bar E, permitting it to drop horizontally, the bolt of the spring-catch F engaging with the receptive slot therefor in the front standard and thus rigidly interlocking the hinged bar to the stated standard; followed by my carrying the brace rod around so that its free extremity may rest in the hook 3. Everything now being properly arranged, I proceed to (by taking hold of the handle G) raise my appliance over a kettle or vessel containing boiling lard or other suitable grease for frying, and lowering same allow it to drop into the grease and penetrate the mass until the base of my structure rests upon the internal bottom of the vessel, the said vessel being of such diameter and depth as will insure, with the requisite quantity of boiling grease therein, sufficient immersion of my device in the boiling body as to well cover the shelves containing the frying food products and the overhead shelf resembling guard. The raw or doughy food products having been immersed a sufficient length of time to insure their proper and uniform frying, I withdraw my device from the grease, and suitably tilting the same and rapping it, the fried products are easily dislodged from the shelves and precipitated into any desired receptacle. This being accomplished, and another batch of food products being in readiness for frying, I again prepare my appliance for the reception and retention of the food products in the manner hereinbefore fully described, and thence proceed to the final stage. Obviously, by the utilization of my device for frying purposes, any number of batches of food products may be fried inside a moderate period of time, the number fried depending upon the capacity and dimensions of my device and the kettle of boiling grease into which it is inserted, the number of repetitions, and the amount of products awaiting frying.

While for bakeries a frying frame of some considerable capacity is preferably employed, it is evident that for family use one of much smaller dimensions will prove satisfactory.

By my provision of wire-formed open-work shelves the boiling grease, wherein my appliance is wholly or partially immersed, must necessarily come into contact with all parts of the food products simultaneously, and causing thorough and uniform frying thereof; all turning of the frying products being unnecessary as ordinarily is required in the commonly employed methods of frying.

For the frying uniformly and expeditiously such food products as doughnuts, fried-cakes, oysters, Saratoga chips, and other products not necessary to enumerate, my frying frame fully answers all the requirements.

Practical tests, upon my part, of the workings of my culinary frying frame have demonstrated to my satisfaction its efficiency, practicability and exceeding value as a frying medium.

While by preference I utilize hinged shelves as shown and described, and as proving the most advantageous and desirable, yet as is readily apparent, shelves adapted to be slid laterally and horizontally into and out of the framework are susceptible of utilization, and coming within the spirit and scope broadly of my invention.

Trials upon my part of shelves laterally movable have evidenced to me their non-practicability and unsatisfactoriness as compared with the hinged shelves preferably employed by me in the construction of my improved frying device.

Having thus fully described the construction of my culinary frying-frame and its manner of operation, what I claim as new, and desire to secure by Letters Patent, is—

1. In a culinary frying-machine, a circular or hoop-like base disposed on edge, side standards rigidly secured thereto and arising a satisfactory height above the said base, perforated circular shelves at moderate intervals apart above the base portion and removably supported on horizontal planes between the standards by means of lateral projections located along the inner sides of the said standards at requisite distances apart, guards for preventing accidental upward raising of the movable shelves, a vertically-swinging locking-bar hinged upwardly to a part of the stationary frame and its opposite end provided with a latch, and also a handle, said hinged locking-bar being adapted when swung downward and securely connecting with another part of the stationary frame to lock the shelves against lateral or other displacement and when swung upward admitting of the movability of said shelves, all combined and operating substantially as set forth.

2. The combination, in a culinary frying-frame, of an annular-like base having a perforated seat, diametrically disposed standards uprising from opposite sides of the base and rigidly secured thereto, perforated circular shelves located on horizontal planes between the standards and above the base, said shelves at coinciding sides of their periphery having hinged connection with one of the standards and at their opposite coinciding sides upheld horizontally by projections connected with or contiguous to the second standard, and a normally horizontal locking-bar located above the shelves and connecting the upper ends of the standards, said bar being hinged at one extremity to the contiguous upper end of a standard and provided at its other extremity with a spring-catch adapted to engage with a slot in the upper end of the receiving standard, and a handle upon the locking-bar midway its length, all constructed and operating substantially as described and for the purposes specified.

In testimony whereof I affix my signature, in presence of two witnesses, this 6th day of December, 1893.

CHARLES G. FOLAND. [L. S.]

Witnesses:
WM. C. RAYMOND,
E. KANKEMOELLER.